United States Patent
Wada et al.

(10) Patent No.: US 10,201,791 B2
(45) Date of Patent: Feb. 12, 2019

(54) METHOD FOR PRODUCING CARBON PARTICLES BY DETONATION

(71) Applicants: KOBE STEEL, LTD., Hyogo (JP); NATIONAL INSTITUTE OF ADVANCED INDUSTRIAL SCIENCE AND TECHNOLOGY, Tokyo (JP)

(72) Inventors: Ryutaro Wada, Tokyo (JP); Masaya Ueda, Hyogo (JP); Yozo Kakudate, Ibaraki (JP); Shuzo Fujiwara, Ibaraki (JP); Shu Usuba, Ibaraki (JP)

(73) Assignees: KOBE STEEL, LTD., Hyogo (JP); NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 178 days.

(21) Appl. No.: 15/313,789

(22) PCT Filed: May 27, 2015

(86) PCT No.: PCT/JP2015/065220
§ 371 (c)(1),
(2) Date: Nov. 23, 2016

(87) PCT Pub. No.: WO2015/182648
PCT Pub. Date: Dec. 3, 2015

(65) Prior Publication Data
US 2017/0183234 A1    Jun. 29, 2017

(30) Foreign Application Priority Data

May 30, 2014 (JP) ................. 2014-113057

(51) Int. Cl.
| | | |
|---|---|---|
| *B01J 3/08* | (2006.01) | |
| *B01J 3/06* | (2006.01) | |
| *C01B 32/25* | (2017.01) | |

(52) U.S. Cl.
CPC .............. *B01J 3/08* (2013.01); *B01J 3/062* (2013.01); *C01B 32/25* (2017.08)

(58) Field of Classification Search
CPC ..................................... B01J 3/06; B01J 3/08
(Continued)

(56) References Cited

U.S. PATENT DOCUMENTS

| 4,483,836 A | 11/1984 | Adadurov et al. |
| 5,353,708 A * | 10/1994 | Stavrev ............... B01J 3/08 |
| | | 102/301 |

(Continued)

FOREIGN PATENT DOCUMENTS

| JP | H03-271109 A | 12/1991 |
| JP | 2005-289677 A | 10/2005 |

(Continued)

OTHER PUBLICATIONS

Dolmatov, Modified Method for Synthesis of Detonation Nanodiamonds and Their Real Elemental Composition, 2008, Russian Journal of Applied Chemistry, vol. 81, No. 10, pp. 1747-1753 (Year: 2008).*

(Continued)

*Primary Examiner* — Timothy Kennedy
(74) *Attorney, Agent, or Firm* — Studebaker & Brackett PC (57) ABSTRACT

A production method of a carbon particle by a detonation method includes a step of disposing an explosive substance in a periphery of a raw material substance, and a step of subjecting the explosive substance to a detonation. The explosive substance is a liquid at normal temperature and
(Continued)

normal pressure. The raw material substance contains an aromatic compound having 3 or more nitro groups.

12 Claims, 2 Drawing Sheets

(58) Field of Classification Search
 USPC .......................................................... 264/84
 See application file for complete search history.

(56) References Cited

U.S. PATENT DOCUMENTS

| | | | | |
|---|---|---|---|---|
| 5,861,349 | A * | 1/1999 | Vereschagin | B01J 3/08 |
| | | | | 423/446 |
| 8,506,920 | B2 * | 8/2013 | Swanson | B82Y 30/00 |
| | | | | 149/108.2 |
| 2009/0004092 | A1 | 1/2009 | Dolmatov | |
| 2009/0175776 | A1 | 7/2009 | Saito et al. | |
| 2009/0285744 | A1 * | 11/2009 | Sugihara | B82Y 30/00 |
| | | | | 423/446 |

FOREIGN PATENT DOCUMENTS

| | | |
|---|---|---|
| JP | 2006-102656 A | 4/2006 |
| JP | 2007-269576 A | 10/2007 |
| JP | 2012-135718 A | 7/2012 |
| JP | 2012-170913 A | 9/2012 |
| WO | 2006/075763 A1 | 7/2006 |

OTHER PUBLICATIONS

The extended European search report issued by the European Patent Office dated Nov. 7, 2017, which corresponds to European Patent Application No. 15799381.7-1375 and is related to U.S. Appl. No. 15/313,789.

International Search Report; PCT/JP2015/063220 dated Aug. 18, 2015; with English language translation.

Written Opinion of the International Searching Authority; PCT/JP2015/063220 dated Aug. 18, 2015; with English language translation.

Yozou Kakudate; "2-3. Dynamic High Pressure (Detonation Method)"; Handbook of Diamond Technology; Industrial Diamond Association of Japan; NGT; Jan. 2007; pp. 28-33; Japan.

* cited by examiner

Calibration Curve for Diamond

METHOD FOR PRODUCING CARBON PARTICLES BY DETONATION

TECHNICAL FIELD

The present invention relates to a method for producing carbon particles by a detonation method. In more detail, the present invention relates to a method for producing carbon particles containing diamond and graphite carbon by a detonation method that uses a raw material substance containing an aromatic compound having 3 or more nitro groups (also called a low explosive raw material).

BACKGROUND ART

Nano-scale diamond (also called nanodiamond) has a large number of excellent properties such as a high hardness and an extremely low coefficient of friction, and therefore, it has been already utilized in various fields and its development of application has been investigated as an extremely promising new material.

It is known that the nanodiamond can be synthesized by, for example, utilizing a detonation reaction of a high explosive. This synthesis method is one generally called a detonation method, in which detonation is performed with only a low explosive raw material as a carbon source, and carbon atoms decomposed and liberated from a molecule constituting the low explosive raw material by the detonation reaction are formed as diamond at high temperature and high pressure during the detonation. As for production of the nanodiamond by the detonation method, for example, see Non-Patent Literature 1.

The production of the nanodiamond by the detonation method has hitherto been performed in, for example, the East European countries such as Russia and the Ukraine, the United States of America, China, and the like. In these countries, since a military waste low explosive is inexpensively available as the low explosive raw material that is the carbon source, trinitrotoluene has been used alone, or trinitrotoluene and cyclotrimethylenetrinitramine (RDX, also called hexogen) or cyclotetramethylenetetranitramine (HMX, also called octogen) have been used together.

CITATION LIST

Non-Patent Literature

Non-Patent Literature 1: Yozo Kakudate (author), "2-3. Dynamic High Pressure (Detonation Method)", Industrial Diamond Association of Japan (editor), "Handbook of Diamond Technology", NGT, January 2007, pp. 28 to 33

SUMMARY OF THE INVENTION

Technical Problem

It is anticipated that the demanded amount of nanodiamond will increase more and more in the future with the development of its application. However, as for the production using a military waste low explosive, there is a limit in the production volume. Therefore, there is a possibility that the supply will be short in the international market in the future. Then, the domestic production is expected. However, the nanodiamond cannot be produced in a good yield by the conventional method described above, which causes a problem of unprofitability in economy.

The present invention solves the above-described conventional problem, and an object thereof is to provide a method for producing carbon particles containing nanodiamond and graphite carbon by a detonation method using a low explosive raw material, and more particularly to provide a method for producing nanodiamond in a good yield.

Solution to Problem

The present inventors have found that in producing carbon particles containing diamond and graphite carbon by a detonation method using a low explosive raw material, when an explosive substance which is liquid at normal temperature and normal pressure is disposed in a periphery of the low explosive raw material and a detonation reaction is performed, carbon particles containing a lot of diamond are obtained, as compared with the conventional method described above, leading to accomplishment of the present invention.

In the present description, a high explosive means a material capable of performing the detonation reaction, and the low explosive raw material is included in the high explosive. In addition, the explosive substance means a substance capable of causing an abrupt combustion reaction. In general, the explosive substances are roughly classified into solid high explosives having no fluidity at normal temperature and normal pressure and liquid high explosives having fluidity at normal temperature and normal pressure. However, in the present description, the explosive substance means the liquid high explosive having fluidity at normal temperature and normal pressure unless otherwise indicated. In the present description, the normal temperature and normal pressure mean conditions of 25° C. and 1 atm.

The explosive substance causes detonation, whereby the raw material substance is decomposed to an atomic level, and carbon atoms liberated therefrom without being oxidized aggregate in a solid state to form diamond or graphite carbon. During the detonation, the raw material substance is in a high-temperature high-pressure state due to a decomposition reaction. However, it is immediately expanded and cooled. A process from this high-temperature high-pressure state to the reduced-pressure cooling is caused within a very short time as compared with usual combustion or deflagration that is an explosion phenomenon slower than the detonation, and therefore, there is no time when the aggregated carbon largely grows. Thus, the nano-scale carbon particles are formed.

That is, the present invention provides a production method of a carbon particle by a detonation method, including a step of disposing an explosive substance which is a liquid at normal temperature and normal pressure in a periphery of a raw material substance containing an aromatic compound having 3 or more nitro groups, and a step of subjecting the explosive substance to a detonation.

The raw material substance used in the production method of the present invention preferably contains at least one kind selected from the group consisting of trinitrotoluene, cyclotrimethylenetrinitramine, cyclotetramethylenetetranitramine, pentaerythritol tetranitrate, and trinitrophenylmethylnitramine, as the aromatic compound having 3 or more nitro groups.

Further, the explosive substance is a liquid high explosive having fluidity at normal temperature and normal pressure. The explosive substance preferably contains at least one kind selected from the group consisting of a mixture of hydrazine and hydrazine nitrate, a mixture of hydrazine and ammonium nitrate, nitromethane, and a mixture of hydrazine and nitromethane.

In the production method of the present invention, it is preferred to perform the detonation in a state where the raw material substance and the explosive substance are charged in a chamber, and/or in a state where a coolant is disposed in a periphery of the raw material substance and the explosive substance in a chamber. Here, when an atmosphere in the chamber does not contain an oxygen gas, and/or when the coolant is a substance which does not substantially produce an oxidative substance such as oxygen or ozone, an oxidation reaction can be inhibited. Therefore, the proportion by mass ratio at which the carbon particles can be recovered from carbon in the raw material substance is improved, and consequently, the proportion by mass ratio at which diamond can be recovered from carbon in the raw material substance is improved. In the present description, the proportion by mass ratio at which the carbon particles can be recovered from carbon in the raw material substance is referred to as the "yield of carbon particles" that is the mass ratio of the carbon particles to the raw material substance. Further, the proportion by mass ratio at which diamond can be recovered from carbon in the raw material substance is referred to as the "yield of diamond" that is the mass ratio of diamond to the raw material substance.

The production method of the present invention may further include a step of recovering the carbon particle from a residue obtained in the detonation step. In the recovery step, for example, when a classification/purification treatment is performed, the carbon particles can be obtained in a form of powder having a desired particle diameter. Two or more of the respective preferred embodiments described above may be arbitrarily combined.

Advantageous Effects of the Invention

According to the production method of the present invention, carbon particles containing diamond and graphite carbon are obtained by a detonation method using a low explosive raw material and a liquid high explosive together. The carbon particles are carbon particles having a high content proportion of diamond, as compared with a conventional product obtained by a detonation method using the low explosive raw material alone or using the low explosive raw material and a solid high explosive together.

DESCRIPTION OF EMBODIMENTS

The production method of the present invention is a method of producing carbon particles by a detonation method, and is characterized in that it includes a step of disposing an explosive substance which is a liquid at normal temperature and normal pressure in a periphery of a raw material substance containing an aromatic compound having 3 or more nitro groups, and a step of detonating the above-described explosive substance.

In the production method of the present invention, first of all, the explosive substance which is liquid at normal temperature and normal pressure is disposed in the periphery of the raw material substance containing the aromatic compound having 3 or more nitro groups. The aromatic compound having 3 or more nitro groups is a low explosive raw material contained in the raw material substance that is a carbon source in the detonation method. The explosive substance which is liquid at normal temperature and normal pressure is a substance for causing stable detonation in order to form the carbon particles from the raw material substance. When a molecule constituting the explosive substance contains a carbon atom, the explosive substance may possibly work as a carbon source together with the raw material substance.

The aromatic compound having 3 or more nitro groups is a compound having a structure in which 3 or more hydrogen atoms of an aromatic ring such as benzene, naphthalene or anthracene are substituted with nitro groups. The above-described aromatic compound may have a substituent other than the nitro group, and the substituents include an alkyl group, a hydroxy group, a hydroxyalkyl group, an amino group, a halogen group, and the like. Though there may be the case where position isomers are present depending on the positional relation of the nitro groups or the substituent, all of the position isomers can be used in the production method of the present invention. For example, when the aromatic compound is trinitrotoluene, 6 kinds of isomers are conceivable from the positional relation of 3 nitro groups and one methyl group. In the present description, trinitrotoluene means 2,4,6-trinitrotoluene unless otherwise indicated.

The above-described aromatic compounds include trinitrotoluene (also called TNT), cyclotrimethylenetrinitramine (RDX, also called hexogen), cyclotetramethylenetetranitramine (HMX, also called octogen), pentaerythritol tetranitrate (also called PETN), trinitrophenylmethylnitramine (also called tetryl), and the like. Among these aromatic compounds, TNT is particularly preferred because it is easily available. The above-described aromatic compounds may be used either alone or in combination of two or more thereof. Specific examples of using the above-described aromatic compounds in combination of two or more thereof include high explosive mixtures mainly composed of RDX and TNT, for example, Composition B, Cyclotol (75/25), (70/30), (65/30), and Composition B-2; high explosive mixtures mainly composed of HMX and TNT, for example, Octol (75/25); high explosive mixtures mainly composed of TNT and tetryl, for example, tetrytol; and the like.

The content proportion of the aromatic compound having 3 or more nitro groups in the raw material substance is generally 50% by mass or more, preferably 80% by mass or more, more preferably 90% by mass or more, and still more preferably 95% by mass or more, relative to the total mass of the raw material substance. Most preferably, the content proportion of the aromatic compound having 3 or more nitro groups has an upper limit of 100% by mass. However, the upper limit thereof may be preferably 99% by mass or about 98% by mass.

In the production method of the present invention, a liquid high explosive having fluidity at normal temperature and normal pressure is used as the explosive substance. When the liquid high explosive is used, the degree of freedom in shape is high, an increase in size is easy, and operability or safety can be improved, as compared with the case of using a solid high explosive. The liquid high explosive may be one containing no carbon as a constituent element. The liquid high explosives include a mixture of hydrazine and hydrazine nitrate, a mixture of hydrazine and ammonium nitrate, a mixture of hydrazine, hydrazine nitrate and ammonium nitrate, nitromethane, a mixture of hydrazine and nitromethane and the like. In the present description, hydrazine includes hydrazine hydrate that is a hydrate thereof.

As for the explosive substance, it is important to use it properly selecting the kind and composition thereof so that the detonation velocity when the explosive substance to be disposed in the periphery is blasted alone is faster than the detonation velocity when the raw material substance to be disposed inside is blasted alone.

The use amounts of the raw material substance and the explosive substance may be each properly adjusted according to the desired amount of the carbon particles, and are not particularly limited. The ratio represented by the explosive substance/the raw material substance is preferably 0.1 or more and more preferably 0.2 or more, and preferably 1 or less, more preferably 0.9 or less and still more preferably 0.8 or less, by mass ratio. When the ratio of the use amount is less than 0.1, the detonation reaction sufficient for forming the carbon particles cannot be performed. Therefore, the yield may possibly be decreased. Conversely, when the ratio of the use amount exceeds 1, the explosive substance is used more than necessary. Therefore, the production costs may possibly increase.

Figure 1:
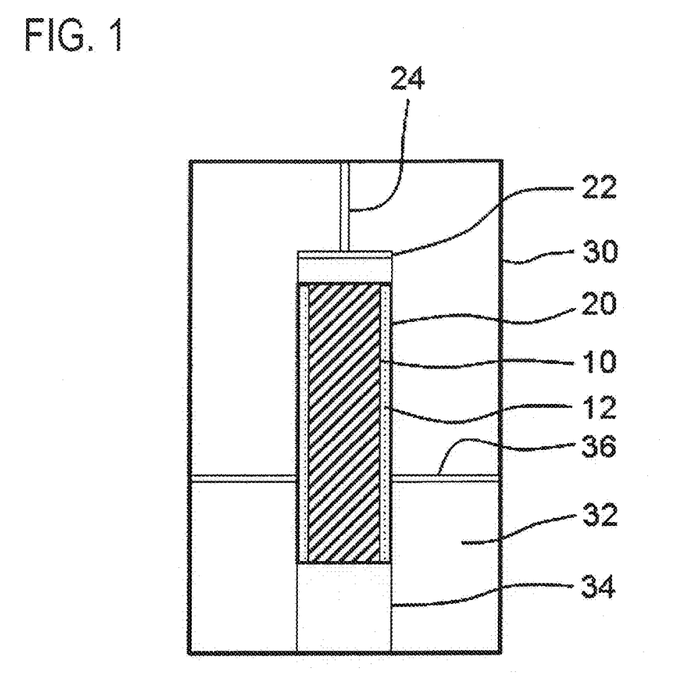
FIG. 1 is a cross-sectional view schematically illustrating an example of an explosive device which is used in a production method of the present invention.

Modes for conducting the production method of the present invention will be described below in detail with reference to the drawings. FIG. 1 is a cross-sectional view schematically illustrating an example of an explosive device which is used in the production method of the present invention. The explosive device illustrated in FIG. 1 is illustrative only and does not intend to limit the present invention.

First of all, an explosive substance 12 is disposed in a periphery of a raw material substance 10. When the explosive substance 12 is disposed in the periphery of the raw material substance 10, it is preferred to symmetrically dispose the raw material substance 10 and the explosive substance 12 in such a manner that high temperature and high pressure associated with a shock wave generated by detonation of the explosive substance 12 are applied to the raw material substance 10 as uniformly as possible, namely, in such a manner that the symmetry of explosion shape is guaranteed. Then, considering that the raw material substance 10 is solid and that the explosive substance 12 is a liquid high explosive, for example, the raw material substance 10 may be melt-loaded or press-loaded to prepare a columnar molded body, and the molded body may be placed in a center part of an inside of a cylindrical container while allowing axial directions thereof to agree with each other. Thereafter, the liquid high explosive may be injected in the periphery thereof. Alternatively, after the liquid high explosive is injected in the cylindrical container, the above-described molded body may be placed in the center part of the inside of the above-described container while allowing axial directions thereof to agree with each other. The container housing the raw material substance and the explosive substance is hereinafter referred to as an "explosion container". As the explosion container 20, it is preferred to use a container made of a synthetic resin such as an acrylic resin, because contamination with impurities such as metals can be prevented.

In the production method of the present invention, subsequently, the explosive substance 12 is detonated to form carbon particles from the raw material substance 10. The shock wave generated by the detonation reaction of the explosive substance 12 propagates towards the raw material substance 10, the raw material substance 10 is compressed by this shock wave to cause the detonation, and carbon atoms liberated, by decomposition, from organic molecules constituting the raw material substance 10 are changed to the carbon particles containing diamond and graphite carbon.

The detonation may be performed in either an open system or a closed system. In order to perform the detonation in the open system, the detonation may be performed in, for example, an inside of an earthwork or a gallery provided by excavating the underground. However, it is preferred to perform the detonation in the closed system because a residue is prevented from being scattered over a wide range. In order to perform the detonation in the closed system, the detonation may be performed in a state where the explosion container is charged in, for example, a chamber. The chamber used for performing the detonation is hereinafter referred to as an "explosion chamber". The explosion chamber may be made of either metal or concrete, as long as it has a sufficient strength to withstand the detonation. The explosion container is preferably charged in the explosion chamber by suspending it.

In the case where the detonation is performed in the explosion chamber, when the atmosphere in the explosion chamber does not substantially contain oxygen on the occasion of the detonation, an oxidation reaction of the carbon fraction can be inhibited. Therefore, the yield of the carbon particles can be improved. In order to obtain such an atmosphere, the atmosphere in the explosion chamber may be substituted with an inert gas such as a nitrogen gas, an argon gas or a carbon dioxide gas; the explosion chamber may be evacuated to about −0.1 to −0.01 MPaG; or after releasing the air (oxygen) from the explosion chamber by evacuation, the inert gas may be injected into the explosion chamber to a weak positive pressure of about +0.000 to +0.001 MPaG. In the present description, the symbol "G" attached after the pressure unit means that it is the gauge pressure.

Further, it is preferred to dispose a coolant in a periphery of the explosion container in the explosion chamber because phase transition to the graphite carbon can be prevented by quenching the formed diamond. In order to dispose the coolant in this way, for example, the explosion container 20 may be placed in a cooling container 30, followed by injecting the coolant 32 into a gap between the cooling container 30 and the explosion container 20. Here, when the coolant 32 is a substance which does not substantially produce an oxidative substance such as oxygen or ozone, the oxidation reaction can be inhibited. Therefore, the yield of the carbon particles is improved. In order to obtain this coolant, for example, an oxygen gas dissolved in the coolant 32 may be removed, or the coolant 32 which does not contain a constituent element producing the oxidative substance such as oxygen or ozone may be used. The coolants 32 include water, halogenated alkyls such as fluorocarbons and carbon tetrachloride, and the like. Water is especially preferred because it does not substantially adversely affect the environment.

Though the explosive substance 12 is generally blasted by using a detonator or a detonating cord, in order to more surely cause the detonation, a booster may be allowed to intervene between the explosive substance 12 and the detonator or the detonating cord. The boosters include, for example, Composition C-4, SEP manufactured by Asahi Kasei Chemicals Corporation, and the like. In this case, after the booster 22 and the detonator or the detonating cord 24 are attached to the explosion container 20, they are, for example, loaded in the explosion chamber. When the coolant 32 is used, it is preferred that the explosion container 20 is housed in a fluid-tight container so that, for example, the coolant 32 does not penetrate into the explosion container 20. The fluid-tight containers include, for example, bags using olefinic synthetic resins such as polyethylene and polypropylene as raw materials. After setting up in this way, when the explosive substance 12 is blasted to perform the detonation, the carbon particles containing diamond and graphite carbon are obtained as a residue thereof.

In the production method of the present invention, the residue obtained in the detonation step may possibly contain, as impurities, blasted wreckage such as a wreck of the explosion container, a lead wire or a wire. In such a case, it is preferred to provide a step of removing the wreckage from the residue obtained in the detonation step to recover the carbon particles. In this recovery step, for example, when a classification/purification treatment is performed, the carbon particles can be obtained in a form of dry powder having a desired particle diameter.

Typically, first of all, after removing rough wreckage from the obtained residue, the resultant is classified with a sieve or the like and separated into a sieve-passing material and a residue on the sieve, and the sieve-passing material is recovered. The residue on the sieve is crushed and then classified again. Water is separated from the sieve-passing material finally obtained to prepare a dry powder. Here, an opening of the sieve is properly adjusted, and the classification/purification treatment is repeated. Then, the sieve-passing material of the sieve having an opening corresponding to a desired particle diameter may be obtained as a product.

In more detail, for example, when the detonation is performed in the explosion chamber using water as the coolant 32, residue-containing water is recovered from the explosion chamber, followed by sedimentation separation. After removing rough wreckage from sediment, a supernatant is recovered as a waste fluid, and a precipitate is classified with a sieve or the like to obtain a sieve-passing material. Since a part of formed carbon particles may possibly attach to the wreckage, a residue on the sieve is crushed and separated by means of ultrasonic vibration or the like and classified again with a sieve or the like. In general, a residue on the sieve of about 30 µm is mostly blasted wreckage such as a wreck of the explosion container 20, a lead wire or a wire. It is therefore preferred to dispose it as an industrial waste after recovery and to recover a sieve-passing material of about 30 µm as a product. As for the recovered product, water is separated by means of centrifugation or the like, followed by drying to obtain a powder of carbon particles having a desired particle diameter.

For example, when an acrylic resin container is used as the explosion container 20, the carbon particles may possibly be contaminated with the acrylic resin. In this case, the acrylic resin may be removed by, for example, an elution treatment of the acrylic resin with acetone. Further, depending on an application, contamination with a metal such as iron is sometimes undesirable. In such a case, for example, the metal such as iron may be removed by treatment with hot concentrated nitric acid.

The carbon particles obtained by the production method of the present invention contain diamond and graphite carbon. Therefore, they are useful for various applications, making good use of excellent properties of diamond and graphite carbon, either in a state as such or in a state where some aftertreatment is performed, as long as graphite carbon sufficiently remains. For example, making good use of excellent properties of diamond, such as polishing properties, durability and wear resistance, they are useful for applications such as a tool, an anti-wear agent, a lubricating agent, a fluid grinding stone, a fixed grinding stone, plating or coating, a durable film, and lithium battery parts. Further, making good use of excellent properties of graphite carbon, such as conductivity, water repellency and biocompatibility, they are useful for applications such as a fiber material, a resin coating for imparting functionality, a drug delivery system, an electronic element cover, an electrode material of a battery, a conductive film, a reinforced rubber or water-repellent rubber, a catalyst, and an adsorbing agent. Furthermore, graphite carbon may be removed by, for example, performing a perchloric acid treatment and/or a plasma oxidation treatment to the carbon particles. In this case, making good use of excellent properties of diamond, such as high refraction, transparency and durability, they are useful particularly for applications of optical components such as an optical lens.

EXAMPLES

The present invention is more specifically described below with reference to Examples. However, the present invention should not be construed as being limited by the following Examples in any way. It is possible to carry out the present invention by properly making variations within the scope capable of being adapted with the gist described above or later, and all these fall within the technical scope of the present invention.

First of all, methods for evaluating the carbon particles of the present invention are described.

<XRD Quantitative Method>

From the measurement results of X-ray diffraction (XRD), the area intensity was determined with respect to the diffraction peak in the (220) plane of diamond appearing near 2θ=75°, and the content proportion of diamond was determined using a calibration curve previously prepared.

As a standard substance for determining the quantity of diamond, diamond was used which had been purified by removing graphite carbon and the like with perchloric acid from diamond-containing carbon particles separately produced in the present invention. A silicon crystal powder (Stansil-G03A manufactured by Osaka Yakken Co. Ltd., D50=5.2 µm) was added as an internal standard to the standard substance.

The calibration curve for diamond was prepared using 5 standard samples by performing 4-point measurement from the ratio of the area intensity of the above-described diffraction peak and the area intensity of the diffraction peak on each of the (220) plane and the (311) plane of a silicon crystal added to each of the samples. Use of the two peaks of the silicon crystal is for the purpose of suppressing the influence of orientation of the powdered silicon. The 5 standard samples were prepared by mixing the above-described silicon crystal powder with the above-described purified diamond so as to give content proportion of diamond of 0% by mass, 25% by mass, 50% by mass, 75% by mass, or 100% by mass.

Figure 4:
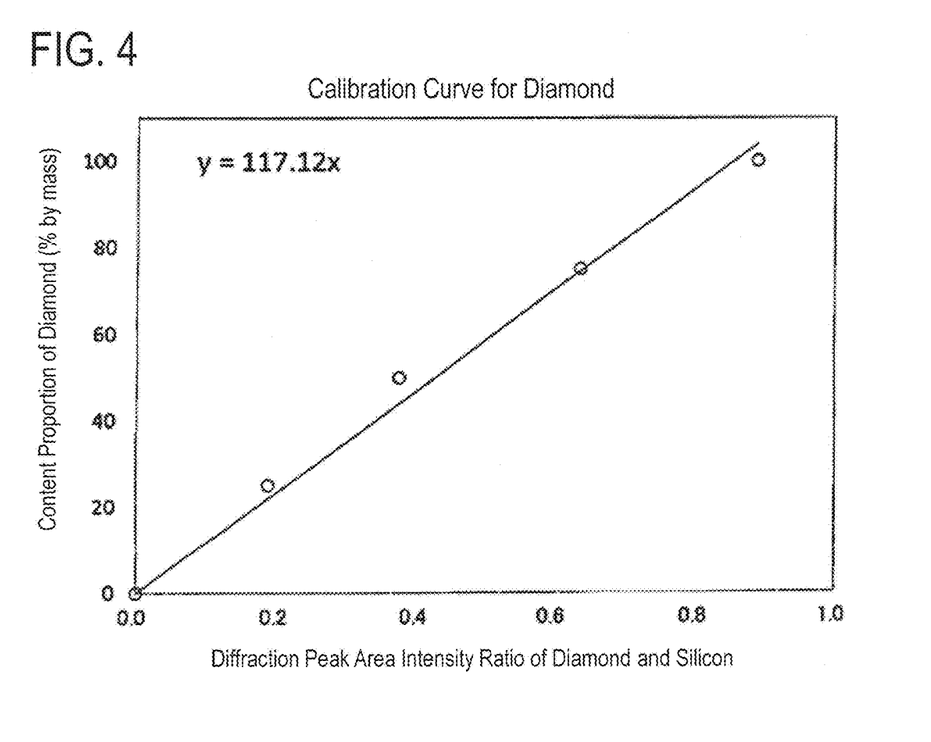
FIG. 4 is a calibration curve graph used in determining the content proportion of diamond in carbon particles.

The calibration curve for diamond was obtained by plotting data of the 5 standard samples, taking the content proportion of diamond on the ordinate and the diffraction peak area intensity ratio D220/(Si220+Si311) of diamond and silicon on the abscissa. A relational expression between the content proportion y and the area intensity ratio x was y=117.12x, according to linear approximation by a least squares method. The obtained calibration curve is shown in FIG. 4.

The above-described silicon crystal powder was added as an internal standard to a measurement sample in an amount of 10% by mass based on the total carbon amount. From the measurement results of the X-ray diffraction (XRD), the above-described diffraction peak area intensity ratio was calculated, and the content proportion of diamond was determined by using the calibration curve shown in FIG. 4. The total recovery amount of diamond was calculated by multiplying the total recovery amount of carbon particles by the obtained content proportion of diamond. It was found that the carbon particles obtained by the production method of the present invention were mainly composed of diamond and graphite carbon. Any carbon component having another structure was not substantially observed. Measurement conditions of the X-ray diffraction are shown below.

Device name of X-ray diffraction device: Horizontal X-ray diffraction device, SmartLab, manufactured by Rigaku Corporation
    Measurement method: θ-2θ
    X-ray source: Cu-Kαray
    Excitation voltage-current: 45 kV-200 mA
    Divergence slit: ⅔°
    Scattering slit: ⅔°
    Receiving slit: 0.6 mm <Transmission Electron Microscopic Observation>

From the results of measurement using a transmission electron microscope, it was confirmed that the carbon particles obtained by the production method of the present invention were formed of diamond and graphite carbon. Therefore, there was used the transmission electron microscope having a CCD camera and a photographing magnification capable of observing lattice images of these carbon components. Measurement conditions of the transmission electron microscope are shown below.

Device name of TEM: Transmission electron microscope, JEM-ARM200F, manufactured by JEOL Ltd.
    Measurement method: Suspension method, dispersion solvent: methanol
    Accelerating voltage: 200 kV
    CCD camera: UltraScan, manufactured by Gatan
    Photographing magnification: 300,000 times and 800,000 times
    Imaging magnification: 2,200,000 times, and 5,900,000 times when printed in A4 size Experimental Examples of producing the carbon particles by the production method of the present invention are described below.

Experimental Example 1

In this Experimental Example, carbon particles were produced by a detonation method using TNT as a raw material substance and a hydrazine-based liquid high explosive as an explosive substance.

A commercially available columnar molded body (a columnar melt-loaded material of TNT manufactured by Chugoku Kayaku Co., Ltd., 10 cm in diameter×20 cm in length) was used as TNT. The mass of the TNT molded body was 2.52 kg, and the density thereof was 1.60 g/cm$^3$. Further, hydrazine nitrate and hydrazine hydrate were mixed at a mass ratio of 3:1 to prepare 0.93 kg of a hydrazine-based liquid high explosive.

Subsequently, a detonation reaction was performed by using the explosive device as illustrated in FIG. 1. The above-described molded body as the raw material substance 10 was placed in the center part of the explosion container 20 having an inside diameter of 12 cm and a height of 20 cm, and the above-described liquid high explosive as the explosive substance 12 was filled in the periphery thereof. The booster 22 (SEP), the detonating cord and the No. 6 electric detonator 24 were installed in a top of the explosion container 20, and after covered with a lid, the container was housed in a fluid-tight polyethylene bag. A container having a capacity of 200 L was used as the cooling container 30. The explosion container 20 was placed in the cooling container 30. Here, an outer bottom surface of the explosion container 20 was adjusted so as to be positioned at a height of 29.5 cm from an inner bottom surface of the cooling container 30, using an iron-made stand 34 and an iron-made perforated disk 36. Then, distilled water was poured as the coolant 32 in the cooling container 30 to fill a gap between the cooling container 30 and the explosion container 20 with the coolant 32. Further, a polyethylene bag containing distilled water was placed on an upper part of the cooling container. 200 L in total of distilled water was used. After the cooling container 30 was covered with a lid, it was suspended in an explosion chamber having an internal volume of 30 m$^3$ from a ceiling thereof by using a wire sling. An inside of the above-described explosion chamber was evacuated from the atmospheric pressure to adjust the amount of a residual oxygen gas to about 25.5 g as calculated value.

After setting up in this way, the above-described detonating cord was blasted by the above-described detonator, thereby detonating the explosive substance 12. Then, about 200 L of water containing a residue was recovered from the inside of the above-described explosion chamber, and rough wreckage was removed by sedimentation separation. Here, a supernatant was strongly alkaline, so that the pH thereof was made weakly acidic by adding citric acid. The supernatant made weakly acidic was recovered as a waste fluid as it is. A precipitate was classified with sieves having an opening of 100 μm/16 μgm using a vibration sieve device ("KG-700-2W" manufactured by Kowa Kogyosho Co., Ltd.). A 16 μm-sieve-passing material was recovered as it is. A residue on the sieve was crushed for about 5 minutes by an ultrasonic vibration device ("4G-250-3-TSA" manufactured by Crest), and a carbon fraction was separated from a wreckage surface and thereafter classified again with sieves having an opening of 100 μm/32 μm/16 μm using the vibration sieve device ("KG-700-2W" manufactured by Kowa Kogyosho Co., Ltd.). Sieve-passing materials were recovered. Each of the sieve-passing materials was allowed to stand in a drying machine ("OF-450S" manufactured by AS ONE Corporation) at 80° C. for 24 hours to evaporate moisture, thereby preparing a dry powder.

Thus, there was obtained 492.5 g in total of carbon particles including 104.5 g of a 16 μm-sieve-passing material, 243.9 g of 32 μm-sieve-passing material and 144.1 g of 100 μm-sieve-passing material. The experiment contents, the recovery amount and yield of the carbon particles, and the total recovery amount and yield of diamond determined by the above-described XRD quantitative method in this Experimental Example are shown in the following Table 1.

Experimental Example 2

In this Experimental Example, carbon particles including 192.1 g of a 16 μm-sieve-passing material, 356.5 g of a 32

μm-sieve-passing material and 222.2 g of a 100 μm-sieve-passing material were obtained in the same manner as in Experimental Example 1, except for changing the TNT molded body having a mass of 2.52 kg and a density of 1.60 g/cm$^3$ to a TNT molded body (a columnar melt-loaded material of TNT manufactured by Chugoku Kayaku Co., Ltd., 10 cm in diameter×30 cm in length) having a mass of 3.82 kg and a density of 1.61 g/cm$^3$, as the raw material substance, and changing the use amount of the hydrazine-based liquid high explosive as the explosive substance from 0.93 kg to 1.29 kg. The total recovery amount of the carbon particles was 770.8 g. The experiment contents, the recovery amount and yield of the carbon particles, and the total recovery amount and yield of diamond determined by the above-described XRD quantitative method in this Experimental Example are shown in the following Table 1.

Experimental Example 3

In this Experimental Example, carbon particles including 257.4 g of a 16 μm-sieve-passing material, 531.8 g of a 32 μm-sieve-passing material and 336.4 g of a 100 μm-sieve-passing material were obtained in the same manner as in Experimental Example 1, except for changing the TNT molded body having a mass of 2.52 kg and a density of 1.60 g/cm$^3$ to a TNT molded body (a columnar melt-loaded material of TNT manufactured by Chugoku Kayaku Co., Ltd., 10 cm in diameter×50 cm in length) having a mass of 6.30 kg and a density of 1.59 g/cm$^3$, as the raw material substance, changing the use amount of the hydrazine-based liquid high explosive as the explosive substance from 0.93 kg to 2.17 kg, and changing the use amount of distilled water as the coolant from 200 L to 220 L. The total recovery amount of the carbon particles was 1125.6 g. The experiment contents, the recovery amount and yield of the carbon particles, and the total recovery amount and yield of diamond determined by the above-described XRD quantitative method in this Experimental Example are shown in the following Table 1.

Figure 2:
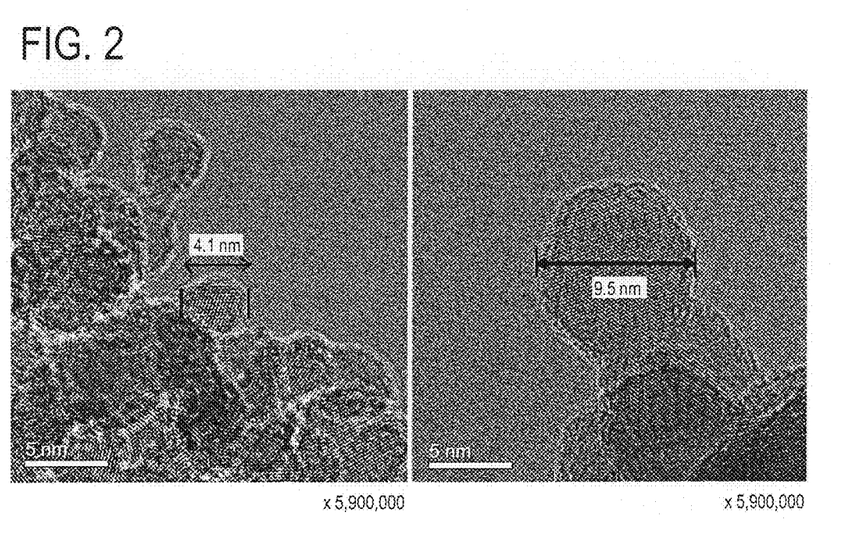
FIG. 2 shows transmission electron microscopic photographs of carbon particles obtained in Experimental Example 3.
Figure 3:
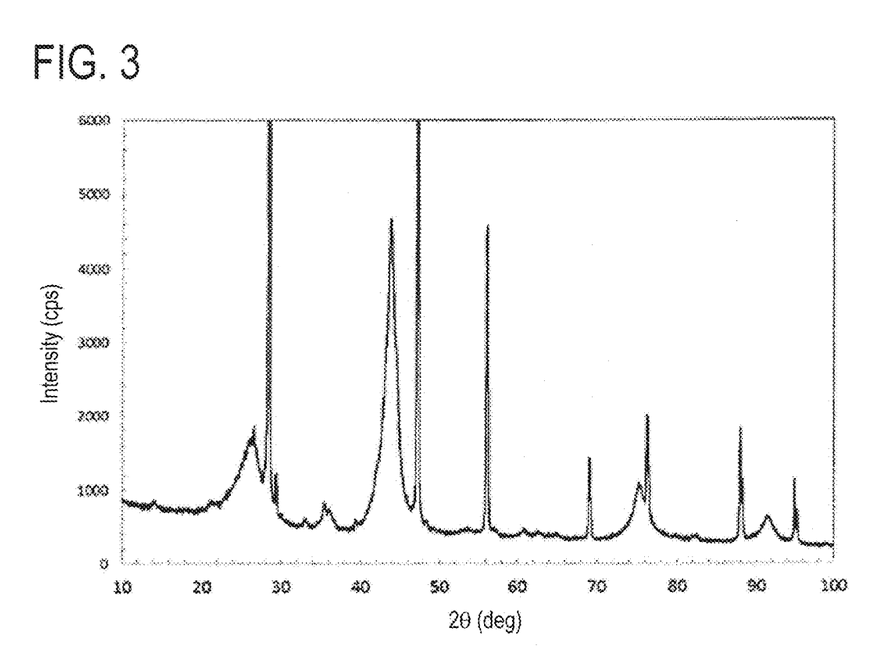
FIG. 3 is an X-ray diffraction chart of carbon particles obtained in Experimental Example 3.

Among the obtained carbon particles, transmission electron microscopic photographs of the 16 μm-sieve-passing material are shown in FIG. 2, and an X-ray diffraction chart of the 100 μm-sieve-passing material is shown in FIG. 3. From the left photograph in FIG. 2, a carbon particle having a particle diameter of about 4.1 nm can be observed. Further, from the right photograph in FIG. 2, a carbon particle having a particle diameter of about 9.5 nm can be observed.

TABLE 1

|  |  | Experimental Example 1 (3#2) | Experimental Example 2 (3#3) | Experimental Example 3 (3#4) |
|---|---|---|---|---|
| Raw Material Substance | Kind | TNT | TNT | TNT |
|  | Mass (kg) | 2.52 | 3.82 | 6.30 |
|  | Volume (cm$^3$) | 1580 | 2380 | 3960 |
|  | Density (g/cm$^3$) | 1.60 | 1.61 | 1.59 |
| Explosive Substance | Kind | NH + HH[1] | NH + HH[1] | NH + HH[1] |
|  | Mass (kg) | 0.93 | 1.29 | 2.17 |
| Cooling Container | Capacity (L) | 200 | 200 | 200 |
| Coolant | Volume (L) | 200 | 200 | 220 |
| Explosion Chamber | Internal Volume (m$^3$) | 30 | 30 | 30 |
|  | Amount of Residual Oxygen Gas (g) | 25.5 | 25.5 | 25.5 |
| Carbon Particles | 16 μm-sieve-passing material (g) | 104.5 | 192.1 | 257.4 |
|  | 32 μm-sieve-passing material (g) | 243.9 | 356.5 | 531.8 |
|  | 100 μm-sieve-passing material (g) | 144.1 | 222.2 | 336.4 |
|  | Total Recovery Amount (g) | 492.5 | 770.8 | 1125.6 |
|  | Yield (% by mass)[2] | 19.5 | 20.2 | 17.9 |
| Diamond | Total Recovery Amount (g) | 231.1 | 432.0 | 616.5 |
|  | Yield (% by mass)[3] | 9.2 | 11.3 | 9.8 |

[1]Hydrazine-based liquid high explosive obtained by mixing hydrazine nitrate ($H_2N$—$NH_2$•$HNO_3$) and hydrazine hydrate ($H_2N$—$NH_2$•$H_2O$) at a mass ratio of 3:1
[2]Yield (%) = 100 × (Total recovery amount (g) of carbon particles/[Mass (kg) of raw material substance × 1000])
[3]Yield (%) = 100 × (Total recovery amount (g) of diamond/[Mass (kg) of raw material substance × 1000])

From Table 1, it is known that even when TNT as the low explosive raw material and the hydrazine-based liquid high explosive are used together, the carbon particles containing diamond and graphite carbon can be produced by the detonation method. Moreover, the obtained carbon particles are carbon particles having a high content proportion of diamond as compared with conventional products. Actually, the yield of diamond shows a value as high as 9.2 to 11.3%. In contrast, according to Table 2 of Non-Patent Literature 1, the yield of diamond in a conventional method is 2.8% in the case of using TNT alone, 4.1 to 8.3% in the case of using TNT and RDX together and 3.75 to 8.2% in the case of using TNT and HMX together. Therefore, it is known that according to the production method of the present invention using the low explosive raw material and the liquid high explosive together, the yield of diamond is improved, as compared with the conventional method using the low explosive raw material alone or using the low explosive raw material and the solid high explosive together.

While the present invention has been described in detail and with reference to specific embodiments thereof, it will be apparent to one skilled in the art that various changes and modifications can be made therein without departing from the spirit and scope of the present invention.

The present application is based on Japanese Patent Application (Application No. 2014-113057) filed on May 30, 2014, and the entire thereof is incorporated herein by reference.

INDUSTRIAL APPLICABILITY

According to the production method of the present invention, diamond can be produced in good yield from a low explosive raw material by a detonation method. Therefore, the production method of the present invention makes significant contributions in various fields related to applications which make good use of excellent properties of diamond.

REFERENCE SIGNS LIST

10: Raw material substance
12: Explosive substance
20: Explosion container
22: Booster
24: Detonator or detonating cord
30: Cooling container 32: Coolant
34: Stand
36: Perforated disk

The invention claimed is:

1. A production method of a carbon particle by a detonation method, comprising a step of disposing an explosive substance which is a liquid at normal temperature and normal pressure on a periphery of a raw material substance comprising an aromatic compound having 3 or more nitro groups, and a step of subjecting the explosive substance to a detonation, wherein:
the detonation is performed in a state where the raw material substance and the explosive substance are charged in a chamber,
a coolant is disposed on a periphery of the chamber containing the raw material substance and the explosive substance, and
the explosive substance and the raw material are separated from the coolant.

2. The production method according to claim 1, wherein the raw material substance comprises at least one kind selected from the group consisting of trinitrotoluene, cyclotrimethylenetrinitramine, cyclotetramethylenetetranitramine, pentaerythritol tetranitrate, and trinitrophenylmethylnitramine.

3. The production method according to claim 1, wherein the explosive substance comprises at least one kind selected from the group consisting of a mixture of hydrazine and hydrazine nitrate, a mixture of hydrazine and ammonium nitrate, nitromethane, and a mixture of hydrazine and nitromethane.

4. The production method according to claim 1, wherein an atmosphere in the chamber does not substantially comprise an oxygen gas.

5. The production method according to claim 1, wherein the coolant is a substance which does not substantially produce an oxidative substance.

6. The production method according to claim 1, further comprising a step of recovering the carbon particle from a residue obtained in the detonation step.

7. The production method according to claim 2, further comprising a step of recovering the carbon particle from a residue obtained in the detonation step.

8. The production method according to claim 3, further comprising a step of recovering the carbon particle from a residue obtained in the detonation step.

9. The production method according to claim 4, further comprising a step of recovering the carbon particle from a residue obtained in the detonation step.

10. The production method according to claim 5, further comprising a step of recovering the carbon particle from a residue obtained in the detonation step.

11. The production method according to claim 1, wherein the coolant is water.

12. The production method according to claim 1, wherein the explosive substance is subjected to a detonation prior to the detonation of the raw material substance.

* * * * *